(12) United States Patent
Yemelyanenko et al.

(10) Patent No.: US 11,868,737 B2
(45) Date of Patent: Jan. 9, 2024

(54) METHOD AND SERVER FOR PROCESSING TEXT SEQUENCE FOR MACHINE PROCESSING TASK

(71) Applicant: YANDEX EUROPE AG, Lucerne (CH)

(72) Inventors: Dmitry Viktorovich Yemelyanenko, Solnechnogorsk (RU); Ivan Sergeevich Provilkov, Angarsk (RU); Elena Aleksandrovna Voyta, Rostov-na-Donu (RU)

(73) Assignee: DIRECT CURSUS TECHNOLOGY L.L.C, Dubai (AE)

( * ) Notice: Subject to any disclaimer, the term of this patent is extended or adjusted under 35 U.S.C. 154(b) by 399 days.

(21) Appl. No.: 17/239,563

(22) Filed: Apr. 24, 2021

(65) Prior Publication Data

US 2021/0334477 A1    Oct. 28, 2021

(30) Foreign Application Priority Data

Apr. 24, 2020   (RU) ................................ 2020114693

(51) Int. Cl.
G06F 40/47       (2020.01)
G06N 20/00       (2019.01)
G06F 40/44       (2020.01)

(52) U.S. Cl.
CPC .............. *G06F 40/47* (2020.01); *G06F 40/44* (2020.01); *G06N 20/00* (2019.01)

(58) Field of Classification Search
None
See application file for complete search history.

(56) References Cited

U.S. PATENT DOCUMENTS

2019/0129947 A1   5/2019   Shin et al.
2019/0130902 A1*  5/2019   Itoh ..................... G06F 40/49
(Continued)

FOREIGN PATENT DOCUMENTS

CN    109033042 A    12/2018
CN    110674646 A    1/2020
CN    110851176 A    2/2020

OTHER PUBLICATIONS

Ivan Provilkov, Dmitrii Emelianenko, Elena Voita "BPE-Dropout: Simple and Effective Subword Regularization" arXiv:1910.13267v1 (Year: 2019).*

(Continued)

*Primary Examiner* — Richemond Dorvil
*Assistant Examiner* — Alexander G Marlow
(74) *Attorney, Agent, or Firm* — BCF LLP

(57) ABSTRACT

Methods and servers for preparing a sequence for a machine processing task. The method includes acquiring: (i) a vocabulary storing tokens, (ii) a merge table indicating possible mergers between pairs of tokens, and (iii) a text sequence. For a given word from the sequence, the method includes using the vocabulary for splitting the word into an initial sequence, and iteratively merging tokens of the initial sequence to generate a final sequence for the given word. The iterative merging includes, at a given merging iteration using the merge table for identifying merges between pairs of adjacent tokens in a current sequence of the given merging iteration, excluding at least one of merge based on a pre-determined probability, and using the reduced set merges for generating a new sequence by performing at least one merge. The new sequence is to be used as a current sequence during a next merging iteration.

18 Claims, 4 Drawing Sheets

(56) References Cited

U.S. PATENT DOCUMENTS

2019/0272444 A1* 9/2019 Misawa ............... G06V 30/416
2020/0034435 A1* 1/2020 Norouzi ................ G06N 3/084

OTHER PUBLICATIONS

Kaj Bostrom, Greg Durrett "Byte Pair Encoding is Suboptimal for Language Model Pretraining" arXiv:2004.03720v1 (Year: 2020).*
Rico Sennrich, Barry Haddow, Alexandra Birch "Neural Machine Translation of Rare Words with Subword Units" arXiv: 1508.07909v5 (Year: 2016).*
Taku Kudo "Subword Regularization: Improving Neural Network Translation Models with Multiple Subword Candidates" arXiv: 1804.10959v1 (Year: 2018).*
Doval et al., "Comparing neural- and N-gram-based language models for word segmentation", Dec. 2, 2018, Journal of the Association for Information Science and Technology, 70(2):187-197, 2019 https://doi.org/10.1002/asi.24082.
Kudo, "Subword Regularization: Improving Neural NetworkTranslation Models with Multiple Subword Candidates", Proceedings of the 56th Annual Meeting of the Association for Computational Linguistics (Long Papers), pp. 66-75, Melbourne, Australia, Jul. 15-20, 2018, https://aclanthology.org/P18-1007.pdf.
Banerjee et al.,"Meaningless yet Meaningful: Morphology Grounded Subword-level NMT", Proceedings of the Second Workshop on Subword/Character LEvel Models, pp. 55-60, New Orleans, Louisiana, Jun. 6, 2018, https://aclanthology.org/W18-1207.pdf.
Kudo et al.,"SentencePiece: A simple and language independent subword tokenizer and detokenizer for Neural Text Processing", Proceedings of the 2018 Conference on Empirical Methods in Natural Language Processing (System Demonstrations), pp. 66-71, Brussels, Belgium, Oct. 31-Nov. 4, 2018, https://aclanthology.org/D18-2012.pdf.
Sennrich et al.,"Neural Machine Translation of Rare Words with Subword Units", Proceedings of the 54th Annual Meeting of the Association for Computational Linguistics, pp. 1715-1725, Berlin, Germany, Aug. 7-12, 2016, https://aclanthology.org/P16-1162.pdf.
Kreutzer et al.,"Learning to Segment Inputs for NMT Favors Character-Level Processing", Technical report for IWSLT 2018 paper, Nov. 5, 2018, https://arxiv.org/pdf/1810.01480v3.
Russian Search Report dated Mar. 22, 2022 issued in respect of the counterpart Russian Patent Application No. RU 2020114693.

\* cited by examiner

METHOD AND SERVER FOR PROCESSING TEXT SEQUENCE FOR MACHINE PROCESSING TASK

CROSS-REFERENCE

The present application claims priority to Russian Patent Application No. 2020114693, entitled "Method and Server for Processing Text Sequence for Machine Processing Task", filed Apr. 24, 2020, the entirety of which is incorporated herein by reference.

FIELD

The present technology relates to machine learning in general and, specifically, to a method and server for processing a text sequence for a machine processing task.

BACKGROUND

With the growth of users accessing the Internet, a vast amount of Internet based services has surfaced. Such services include, for example, search engine services (such as Yandex™ and Google™ search engines, for example) that allow users to retrieve information by submitting queries to a search engine. Also, social network services as well as multimedia services enable a large variety of users with different social and cultural backgrounds to engage with each other on unified platforms for exchanging content and information. Digital content and other information being exchanged amongst users may be in a variety of languages. For that reason, due to the ever-increasing amount of information being exchanged on the Internet, translation services such as Yandex.Translate™, for example, are often used.

The latter service has been particularly useful in allowing users to easily translate a text (or even a speech) from one language, which the user does not understand, into another one, which she does. This means that translation services are generally designed to provide a translated version of content in a language that the user understands to make that content intelligible for the user.

Despite the recent advances, conventional computer systems providing translation services still have many drawbacks. For example, typical machine translations are not well adapted to select a correct translation for a word in a specific context or with a particular meaning.

This inability to provide the correct/best translation renders translation services offered to users less desirable or useful, which may affect user retention rates for Internet companies that provide these translation services.

SUMMARY

Developers of the present technology have appreciated certain technical drawbacks associated with the existing translation services. Conventional systems often provide translations of text to users. However, these translations may not be the correct/best translations. This is mainly due to the fact that a given word in a first language may be used in a variety of contexts and can thus have a variety of meanings. As a result, a variety of parallel words in a second language may potentially be used as translations for the given word.

Conventional systems also employ subword segmentation techniques for generating training data that will be used to train a translation engine. One way of achieving subword segmentation is the use of Byte Pair Encoding (BPE) during training data preparation. BPE keeps common words intact while splitting rare, or unknown words into a sequence of "subword" units. Using subword units during training allows the translation model to make use of the morphology, word composition, and transliteration of words to better execute translation tasks.

Developers of the present technology have realized that BPE has several drawbacks due to its deterministic nature—that is, BPE is used to split words into unique subword sequences, which means that for each word the model will produce only one segmentation. Thus, developers of the present technology have devised methods and system that improve on conventional translation engines that use BPE and which are (i) better at exploiting the morphology, (ii) more efficient at learning the compositionality of words and (iii) more robust to segmentation errors.

In at least some embodiments of the present technology, the developers of the present technology have devised methods and system that allow generating multiple segmentation alternatives for a given word. In addition to that, developers of the present technology have devised methods and systems that allow generating multiple segmentation alternatives for a given word while employing the BPE framework. It can also be said that developers of the present technology have devised a modified BPE framework for generating multiple segmentation alternatives for a given word.

For example, in the conventional BPE framework, the system is configured to build a vocabulary of subwords, and a merge table specifying which subwords are to be merged into a bigger subword (as well as the priorities of respective merges). During segmentation, words are first split into sequences of characters, then the learned merge operations are applied to merge the characters into larger, known tokens, until no further merges can be done (based on the vocabulary of subwords and the merge table). In contrast, the modified BPE framework employs a regularization method that is compatible with conventional BPE. This modified BPE framework uses a vocabulary and a merge table can be built via BPE, but at each merge step, some merges are randomly "dropped" (prohibited for the current merge step). Hence, this results in different segmentation alternatives for a same word if the process is executed several times on the same word.

In a first broad aspect of the present technology, there is provided a computer-implemented method for processing a text sequence for a machine processing task to be performed by a Machine Learning Algorithm (MLA). The method executable by a server. The method comprises acquiring, by the server, a token vocabulary. The token vocabulary stores a set of tokens from a pre-determined corpus of text. A given token from the set of tokens is one of a single character and a merged set of tokens. The method comprises acquiring, by the server, a merge table. The merge table indicates possible mergers between pairs of tokens from the set of tokens. A given token from a given possible merge is associated with a respective frequency of occurrence of the given token in the pre-determined corpus of text. The method comprises acquiring, by the server, the text sequence indicative of at least one word. The method comprises for a given word from the text sequence, using, by the server, the token vocabulary for splitting the given word into an initial token sequence. The initial token sequence represents individual characters of the given word. The method comprises for a given word from the text sequence, iteratively merging, by the server, tokens of the initial token sequence to generate a final token sequence for the given word. The iteratively merging includes for a given word from the text sequence at a given merging iteration using, by the server, the merge table for identifying a set of possible merges between pairs of adjacent tokens in a current token sequence of the given merging iteration. The iteratively merging includes for a given word from the text sequence at a given merging iteration, excluding, by the server, at least one of the set of possible merges based on a pre-determined dropout probability, and thereby generating a reduced set of possible merges for the given merging iteration. The reduced set of possible merges is smaller than the set of possible merges. The iteratively merging includes for a given word from the text sequence at a given merging iteration, using, by the server, the reduced set of possible merges for generating a new token sequence by performing at least one of the reduced set of possible merges in the current token sequence. The new token sequence is to be used by the server as a current token sequence during a next merging iteration. The iteratively merging includes for a given word from the text sequence at an other given merging iteration after the given merging iteration, in response to no more merges being available for a current token sequence of the other given merging iteration, identifying, by the server, the current token sequence of the other given merging iteration as the final token sequence to be used for the machine processing task.

In some embodiments of the method, the using the reduced set of possible merges comprises selecting, by the server, the at least one of the reduced set of possible merges to be performed based on the respective frequency of occurrence of the reduced set of possible merges.

In some embodiments of the method, the method further comprises acquiring an indication of the pre-determined dropout probability.

In some embodiments of the method, the MLA is a Neural Machine translation type MLA.

In some embodiments of the method, the MLA is for use with a search engine application.

In some embodiments of the method, the MLA is for use with a targeted advertising selection application.

In some embodiments of the method, the method further comprises prior to, the acquiring the token vocabulary and the acquiring of the merge table, generating the token vocabulary and the merge table based on the pre-determined corpus of text.

In some embodiments of the method, the corpus of text does not contain the text sequence.

In some embodiments of the method, the generating the token vocabulary comprises an initialization routine based on a character vocabulary.

In some embodiments of the method, the generating the merge table comprises an initialization routine with an empty table.

In some embodiments of the method, the text sequence is a first text sequence including a given word. The method further comprises processing a second text sequence having the given word, and a first final token sequence of the given word associated with the first text sequence is different from a second final token sequence of the given word associated with the second text sequence.

In some embodiments of the method, a difference between the first final token sequence and the second final token sequence are attributable to different respective ones of the reduced set of possible merges used.

In some embodiments of the method, the difference is further attributable to a different respective one of the dropout probabilities used.

In a second broad aspect of the present technology, there is provided a computer-implemented method for processing a text sequence for a machine processing task to be performed by a Machine Learning Algorithm (MLA). The method is executable by a server. The method comprises acquiring, by the server, a token vocabulary. The token vocabulary stores a set of tokens from a pre-determined corpus of text. A given token from the set of tokens is one of a single character and a merged set of tokens. The method comprises acquiring, by the server, a merge table. The merge table indicates possible mergers between pairs of tokens from the set of tokens. A given token from a given possible merge is associated with a respective frequency of occurrence of the given token in the pre-determined corpus of text. The method comprises acquiring, by the server, the text sequence indicative of at least one word. The method comprises for a given word from the text sequence, using, by the server, the token vocabulary for splitting the given word into an initial token sequence. The initial token sequence represents individual characters of the given word. The method comprises for a given word from the text sequence, iteratively merging, by the server, tokens of the initial token sequence to generate a final token sequence for the given word. The iteratively merging includes at a given merging iteration, using, by the server, the merge table for identifying a set of possible merges between pairs of adjacent tokens in a current token sequence of the given merging iteration. The iteratively merging includes at a given merging iteration, using, by the server, a pre-determined probability for selectively including possible merges from the set of possible merges into an augmented set of possible merges for the given merging iteration. The iteratively merging includes at a given merging iteration, using, by the server, the augmented set of possible merges for generating a new token sequence by performing at least one of the augmented set of possible merges in the current token sequence. The new token sequence is to be used by the server as a current token sequence during a next merging iteration. The iteratively merging includes at an other given merging iteration after the given merging iteration, in response to no more merges being available for a current token sequence of the other given merging iteration, identifying, by the server, the current token sequence of the other given merging iteration as the final token sequence to be used for the machine processing task.

In some embodiments of the method, the augmented set of possible merges is smaller than the set of possible merges.

In some embodiments of the method, the augmented set of possible merges is the same as the set of possible merges.

In a third broad aspect of the present technology, there is provided a server for processing a text sequence for a machine processing task to be performed by a Machine Learning Algorithm (MLA). The server has access to the MLA. The server is configured to acquire a token vocabulary. The token vocabulary stores a set of tokens from a pre-determined corpus of text. A given token from the set of tokens is one of a single character and a merged set of tokens. The server is configured to acquire a merge table. The merge table indicates possible mergers between pairs of tokens from the set of tokens. A given token from a given possible merge is associated with a respective frequency of occurrence of the given token in the pre-determined corpus of text. The server is configured to acquire the text sequence indicative of at least one word. The server is configured to, for a given word from the text sequence, use the token vocabulary for splitting the given word into an initial token sequence. The initial token sequence represents individual characters of the given word. The server is configured to, for a given word from the text sequence, iteratively merge tokens of the initial token sequence to generate a final token sequence for the given word. The iteratively merging includes the server configured to, at a given merging iteration, use the merge table for identifying a set of possible merges between pairs of adjacent tokens in a current token sequence of the given merging iteration. The iteratively merging includes the server configured to, at a given merging iteration, exclude at least one of the set of possible merges based on a pre-determined dropout probability, thereby generating a reduced set of possible merges for the given merging iteration. The reduced set of possible merges is smaller than the set of possible merges. The iteratively merging includes the server configured to, at a given merging iteration, use the reduced set of possible merges for generating a new token sequence by performing at least one of the reduced set of possible merges in the current token sequence. The new token sequence is to be used by the server as a current token sequence during a next merging iteration. The iteratively merging includes the server configured to, at an other given merging iteration after the given merging iteration, in response to no more merges being available for a current token sequence of the other given merging iteration, identify the current token sequence of the other given merging iteration as the final token sequence to be used for the machine processing task.

In some embodiments of the server, to use the reduced set of possible merges comprises the server configured to select the at least one of the reduced set of possible merges to be performed based on the respective frequency of occurrence of the reduced set of possible merges.

In some embodiments of the server, the server is further configured to acquire an indication of the pre-determined dropout probability.

In some embodiments of the server, the MLA is a Neural Machine translation type MLA.

In some embodiments of the server, the MLA is for use with a search engine application.

In some embodiments of the server, the MLA is for use with a targeted advertising selection application.

In some embodiments of the server, the server is further configured to, prior to being configured to acquire the token vocabulary and the merge table, generate the token vocabulary and the merge table based on the pre-determined corpus of text.

In some embodiments of the server, the corpus of text does not contain the text sequence.

In some embodiments of the server, to generate the token vocabulary comprises an initialization routine based on a character vocabulary.

In some embodiments of the server, to generate the merge table comprises an initialization routine with an empty table.

In some embodiments of the server, the text sequence is a first text sequence including a given word and the method further comprises processing a second text sequence having the given word. A first final token sequence of the given word associated with the first text sequence is different from a second final token sequence of the given word associated with the second text sequence.

In some embodiments of the server, a difference between the first final token sequence and the second final token sequence are attributable to different respective ones of the reduced set of possible merges used.

In some embodiments of the server, the difference is further attributable to a different respective ones of the dropout probability used.

In yet an other broad aspect of the present technology, there is provided a computer-implemented method for processing a text sequence for a machine processing task to be performed by a Machine Learning Algorithm (MLA). The method is executable by a server. The method comprises acquiring, by the server, a token vocabulary. The token vocabulary stores a set of tokens from a pre-determined corpus of text. A given token from the set of tokens is one of a single character and a merged set of tokens. The method comprises acquiring, by the server, a merge table. The merge table indicates possible mergers between pairs of tokens from the set of tokens. A given token from a given possible merge is associated with a respective frequency of occurrence of the given token in the pre-determined corpus of text. The method comprises acquiring, by the server, the text sequence indicative of at least one word. The method comprises, for a given word from the text sequence, using, by the server, the token vocabulary for splitting the given word into an initial token sequence. The initial token sequence represents individual characters of the given word. The method comprises, for a given word from the text sequence, iteratively merging, by the server, tokens of the initial token sequence to generate a final token sequence for the given word. The iteratively merging includes, at a given merging iteration, using, by the server, the merge table for identifying a set of possible merges between pairs of adjacent tokens in a current token sequence of the given merging iteration. The iteratively merging includes, at a given merging iteration, using, by the server, a stochastically-driven algorithm for excluding at least one of the set of possible merges, and thereby generating a reduced set of possible merges for the given merging iteration. The reduced set of possible merges is smaller than the set of possible merges. The iteratively merging includes, at a given merging iteration, using, by the server, the reduced set of possible merges for generating a new token sequence by performing at least one of the reduced set of possible merges in the current token sequence. The new token sequence is to be used by the server as a current token sequence during a next merging iteration. The iteratively merging includes, at an other given merging iteration after the given merging iteration, in response to no more merges being available for a current token sequence of the other given merging iteration, identifying, by the server, the current token sequence of the other given merging iteration as the final token sequence to be used for the machine processing task.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Furthermore, APPENDIX A has been enclosed following the Detailed Description. The APPENDIX A comprises an article entitled "BPE-dropout: Simple and Effective Subword regularization" providing information regarding at least some aspects of the present technology described herein and/or additional aspects of the present technology. The APPENDIX A and the information forming part thereof have been enclosed for reference purposes and are to be deleted from the application prior to the publication of the application as a patent.

DETAILED DESCRIPTION

Figure 1:
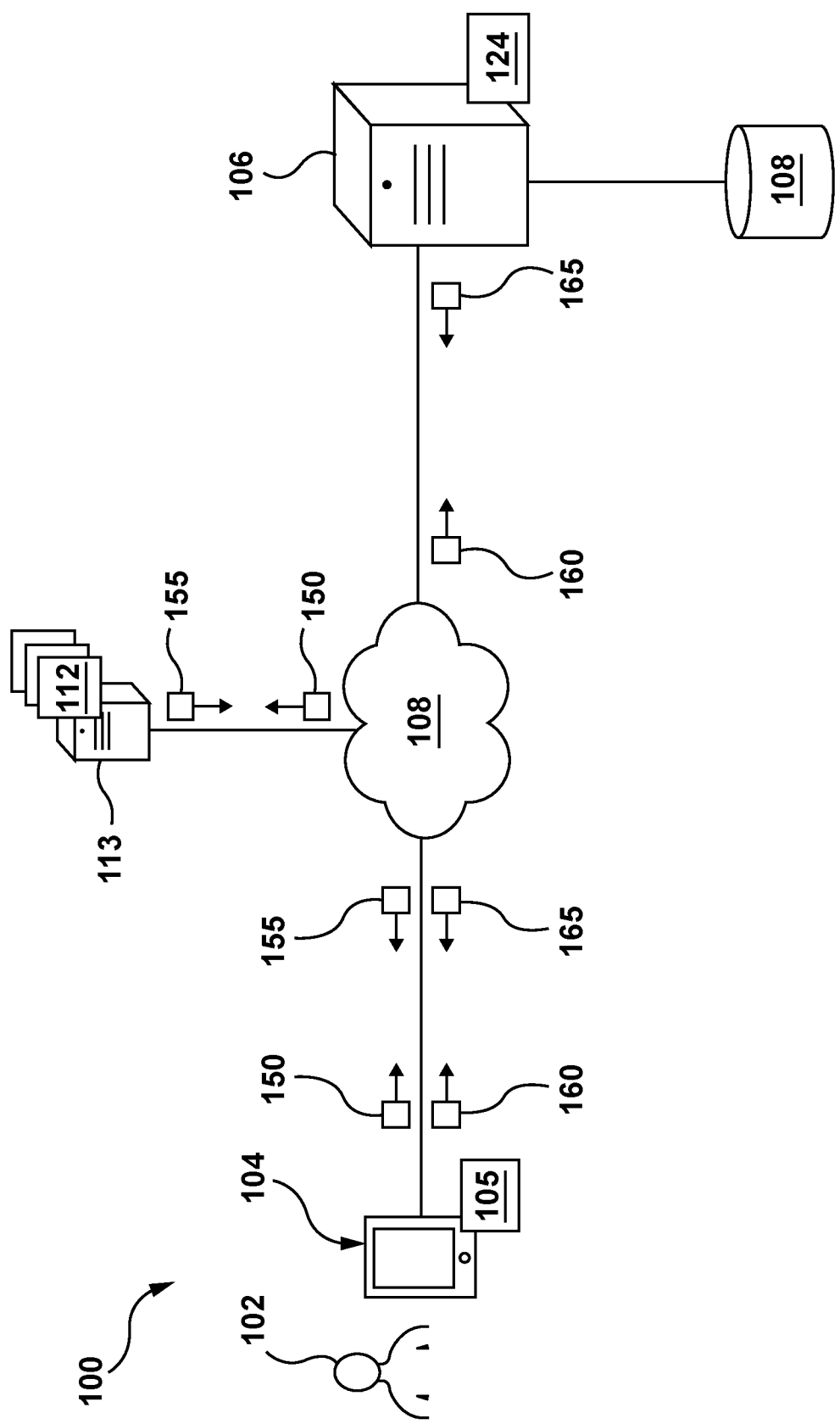
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide electronic translation services for a user 102 of an electronic device 104. For example, the system 100 may be configured to provide a translated version of at least a portion of a given network resource, such as a given web page (or portion thereof), for example, to the electronic device 104 for display thereof to the user 102.

For example, the user 102 may be desirous of appreciating content of a given web page. However, in some cases, the content on the given web page may be in a language that is foreign (non-comprehensible) to the user 102. In many such situations, it may be desirable to provide translation services to the user 102, which aid the user 102 in understanding the content being displayed thereto.

In some embodiments of the present technology, the translation services of the system 100 may be designed to provide a translated version of the content to the electronic device 104 for display to the user 102, and where the translated version is in a language that the user 102 understands. In other words, the translation services of the system 100 may be designed to provide a translated version of the content which is intelligible to the user 102.

In other embodiments, the user 102 may use the electronic device 104 for accessing translation services hosted on a remote device, such as for example, a server 106. In such cases, the user 102 may use the electronic device 104 for providing content to be translated to the server 106, and in response, the server 106 may make use of one or more computer-implemented algorithms for generating translated content (in a desired language) and providing this translated content to the electronic device 104 for display to the user 102.

At least some components of the system 100 will now be described, however, it should be understood that other components to those depicted in FIG. 1 may be part of the system 100 without departing from the scope of the present technology.

Electronic Device

The system 100 comprises the electronic device 104, the electronic device 104 being associated with the user 102. As such, the electronic device 104 can sometimes be referred to as a "client device", "end user device", "client electronic device" or simply "device". It should be noted that the fact that the device 104 is associated with the user 102 does not need to suggest or imply any mode of operation—such as a need to log in, a need to be registered, or the like.

The implementation of the device 104 is not particularly limited, but as an example, the device 104 may be implemented as a personal computer (desktops, laptops, netbooks, etc.), a wireless communication device (such as a smartphone, a cell phone, a tablet and the like), as well as network equipment (such as routers, switches, and gateways). The device 104 comprises hardware and/or software and/or firmware (or a combination thereof), as is known in the art, to execute a browser application 105.

Generally speaking, the purpose of the browser application 105 is to enable the user 102 to access one or more network resources, such as web pages, for example. How the browser application 105 is implemented is not particularly limited. One example of the browser application 105 may be embodied as a Yandex™ browser. The browser application 105 of the electronic device 104 may enable the user 102 to navigate a plurality of network resources 112. In one non-limiting example, the plurality of network resources 112 may correspond to web pages hosted by one or more network servers 113.

For example, upon the user 102 providing indication of an address of a given one of the plurality of network resources 112, the browser application 105 may trigger the electronic device 104 to generate a resource request 150 destined to a given network server 113 hosting the given one of the plurality of network resources 112. The resource request 150 may take form of a data packet that comprises computer-readable instructions configured to request information from the given network server 113 hosting the given one of the plurality of network resources 112.

Also, the electronic device 112 is also configured to receive a resource response 155 originating from the given network server 113 hosting the given one of the plurality of network resources 112. The resource response 155 may take form of another data packet that comprises computer-readable instructions configured to allow the browser application 105 to display content of the given one of the plurality of network resources 112.

How resource requests 150 and resource responses 155 may be transmitted between the electronic device 104 and the one or more network servers 113 is not particularly limited. However, it should be noted that at least one of the browser application 105 and at least one of the plurality of network resources 112 may allow provision of translation services to the user 102. For example, the browser application 105 and/or one or more of the plurality of network resources 112 may be implemented with a translation engine (composed of one or more computer-implemented algorithms aimed at translating content) that may allow translating content for the user 102 from one language to an other one. As it will be described in greater details herein further below, the browser application 105 may be communicatively coupled with a server 106 for providing translation services to the user 102.

Communication Network

The device 104 is communicatively coupled to a communication network 110 for accessing the one or more network servers 113 hosting the plurality of network resources 112. For example, the device 104 may be communicatively coupled with the one or more network server 113 via the communication network 110 for providing the user 102 with the content of the plurality of network resources 112.

It is contemplated that the device 104 is also communicatively coupled to the communication network 110 for accessing a server 106. For example, the device 104 may be communicatively coupled with the server 106 via the communication network 110 for providing the user 102 with the translation services mentioned above.

In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the device 104 and the communication network 110 is implemented will depend inter alia on how the device 104 is implemented.

Merely as an example and not as a limitation, in those embodiments of the present technology where the device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the device 104 is implemented as a notebook computer, the communication link can be either wireless (such as Wireless Fidelity, or WiFi® for short, Bluetooth® or the like) or wired (such as an Ethernet based connection).

The communication network 110 is configured to transmit inter alia the resource requests 150 from the device 104 to the respective ones of the one or more network servers 113 and the resource responses 155 from the respective ones of the one or more network servers 113 to the device 104.

It is also contemplated that the communication network 110 is configured to transmit inter alia server requests 160 from the device 104 to the server 106 and the server responses 165 from the server 106 to the device 104. How the server requests 160 and the server response 165 are implemented is not particularly limited. However, generally speaking, the server requests 160 and the server responses 165 may be used for enabling the translation services of the server 106.

A given network server amongst the one or more network servers 113 can be implemented as a conventional computer server. In an example of an embodiment of the present technology, the given network server can be implemented as a Dell™ PowerEdge™ Server running the Microsoft™ Windows Server™ operating system. Needless to say, the given network server can be implemented in any other suitable hardware, software, and/or firmware, or a combination thereof.

Plurality of Network Resources

Generally speaking, the one or more network servers 113 are configured to host the plurality of network resources 112. In some embodiments of the present technology, each of the plurality of network resources 112 may be implemented as a respective web page hosted by a respective one of the one or more network servers 113. Also, a given one of the one or more network servers 113 may host one or more of the plurality of network resources 112. For example, the given one of the one or more network server 113 may host a website including more than one of the plurality of network resources 112.

When the user 102 provides the address of the desired network resource via the browser application 105, the electronic device 104 transmits the respective resource request 150 to a respective network server 113 hosting the desired network resource (e.g., being amongst the plurality of network resources 112). This resource request 150 comprises computer-readable instructions for retrieving a given electronic document from the respective network server 113, and where the given electronic document comprises content to be displayed to the user 102 via the browser application 105.

The nature of the electronic document is not particularly limiting but, for sake of illustration only, the given electronic document may be representative of a given web page (e.g., the desired network resource) that is hosted by the respective network server 113. For example, the given electronic document may be written in a markup language such as HTML, XML and the like.

Therefore, it can be said that the purpose of the resource request 150 is to instruct a given network server to provide the electronic device 104 with a given electronic document that comprises content to be displayed to the user 102 via the browser application 105.

In response to the respective resource request 150, the respective network server 113 transmits the resource response 155 to the electronic device 104. The resource response 155 comprises the given electronic document. Therefore, it can be said that the purpose of the resource response 155 is to transmit data representative of the given electronic document to the electronic device 104.

Generally speaking, the given electronic document being representative of a given web page (e.g., the desired network resource) is indicative of (i) what content is to be displayed by the browser application 105 to the user 102, and (ii) how this content is to be displayed by the browser application 105 to the user 102. Put another way, the given electronic document is indicative of (i) the content of the given web page that is to be displayed by the browser application 105 to the user 102, and (ii) rendering instructions for instructing the browser application 105 as to how the content of the given web page is to be displayed on the electronic device 104.

In at least some embodiments of the present technology, it is contemplated that the user 102 may select at least some content of a given network resource being displayed thereto via the electronic device 104 and may make use of the electronic device 104 for accessing translation services of the server 106. How the server 106 is configured to implement the translation services will be described in greater details herein further below.

Server

Returning to the description of FIG. 1, the system 100 also comprises the server 106 that can be implemented as a conventional computer server. It is contemplated that the server 106 may be implemented in a similar manner as a given network server of the one or more network servers 113, without departing from the scope of the present technology.

In the depicted non-limiting embodiments of the present technology, the server 106 is a single server. In alternative non-limiting embodiments of the present technology, functionalities of the server 106 may be distributed and may be implemented via multiple servers. The server 106 may include one or more processors, one or more non-transitory memory devices, computer-readable instructions, and/or additional hardware components, additional software components, and/or combination thereof, for implementing various functionalities of the server 106, without departing from the scope of the present technology.

Generally speaking, the server 106 can be under control and/or management of a translation service provider (not depicted), such as, for example, an operator of Yandex™ translation services. It is contemplated that the provider of the translation services and the provider of the browser application 105 may be the same provider. For example, the browser application 105 (e.g., Yandex™ browser) and the translation services (e.g., Yandex™ translation services) may be provided, controlled and/or managed by the same operator or entity.

It can be said that the server 106 may be configured to execute one or more computer-implemented algorithms for (i) acquiring content to be translated, (ii) processing/preparing this content for translation, (iii) generating translated content based thereon, and (iv) providing the translated content to the user 102 of the electronic device 104.

In at least some embodiments of the present technology, the server 106 may implement and/or have access to a Machine Learning Algorithm (MLA) 124. Generally speaking, MLAs can learn from training samples and make predictions on new (unseen) data. The MLAs are usually used to first build a model based on training inputs of data in order to then make data-driven predictions or decisions expressed as outputs, rather than following static computer-readable instructions.

The MLAs are commonly used as estimation models, ranking models, classification models and the like. It should be understood that different types of the MLAs having different structures or topologies may be used for various tasks.

One particular type of MLAs includes Neural Networks (NNs). Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus rather than trying to determine complex statistical arrangements or mathematical algorithms for a given situation; the given NN tries to provide an "intuitive" answer based on a "feeling" for a situation.

NNs are commonly used in many such situations where it is only important to know an output based on a given input, but exactly how that output is derived is of lesser importance or is unimportant. For example, NNs are commonly used to optimize the distribution of web-traffic between servers, automatic text translation into different languages, data processing, including filtering, clustering, vector embedding, and the like.

To summarize, the implementation of the MLA 124 by the server 106 can be broadly categorized into two phases—a training phase and an in-use phase. First, the given MLA is trained in the training phase. Then, once the given MLA knows what data to expect as inputs and what data to provide as outputs, the given MLA is actually run using in-use data in the in-use phase.

Developers of the present technology have realized that processing and/or preparing data for training the MLA 124 to generate translated content may allow the MLA 124 to in a sense, "learn" to better translate content. For example, developers of the present technology have realized that executing subword segmentation on text sequences to be used as part of the training data may be beneficial for learning purposes of the MLA 124.

One way of achieving subword segmentation is the use of Byte Pair Encoding (BPE) during training data preparation. Broadly speaking, BPE keeps common words intact while splitting rare, or unknown words into a sequence of "subword" units. Using subword units during training allows the translation model (e.g., the MLA 124) to make use of the morphology, word composition, and transliteration of words to better execute translation tasks.

Developers of the present technology have realized that conventional BPE has several drawbacks due to its deterministic nature—that is, BPE is used to split words into unique subword sequences, which means that for each word the model will produce only one segmentation. Thus, developers of the present technology have devised methods and system that improve on conventional translation engines that use BPE and which are (i) better at exploiting the morphology, (ii) more efficient at learning the compositionality of words and (iii) more robust to segmentation errors.

However, it should be noted that although the embodiments herein are provided for the purpose of processing data for generating training data for training the MLA 124 for executing translation task, on other embodiments of the present technology, the methods and systems described herein may aid in processing data for generating training data for training the MLA 124 to perform other tasks. For example, the MLA 124 may be used by the server 106 as part of a search engine application for providing better search results to users of the search engine application. In another example, the MLA 124 may be used by the server 106 as part of a target advertising selection application for providing targeted advertisers to users of the target advertising application. In yet another example, the MLA 124 may be used by the server 106 as part of a recommendation application for providing better content recommendations to users of the recommendation application.

In at least some embodiments of the present technology, the developers of the present technology have devised methods and system that allow generating multiple segmentation alternatives for a given word. In addition to that, developers of the present technology have devised methods and systems that allow generating multiple segmentation alternatives for a given word while employing the BPE framework. It can also be said that developers of the present technology have devised a modified BPE framework for generating multiple segmentation alternatives for a given word by adding a stochastic component thereto.

For example, in the conventional BPE framework, the system is configured to build a vocabulary of subwords, and a merge table specifying which subword shave to be merged into a bigger subword (as well as the priorities of respective merges). During segmentation, words are first split into sequences of characters, then the learned merge operations are applied to merge the characters into larger, known symbols, until no merge can be done. In contrast, the modified BPE framework proposed by the developers of the present technology employs a regularization method that is compatible with conventional BPE. This modified BPE framework uses a vocabulary and a merge table that may be built via BPE, but at each merge step, some merges are randomly "dropped" (prohibited for the current merge step)—hence, this results in different segmentation alternatives for a same word.

How conventional subword segmentation using conventional BPE framework may be performed and how, in contrast, the modified BPE framework may be employed by the server 106 will be described in greater details herein further below with reference to FIG. 3.

Database

Figure 2:
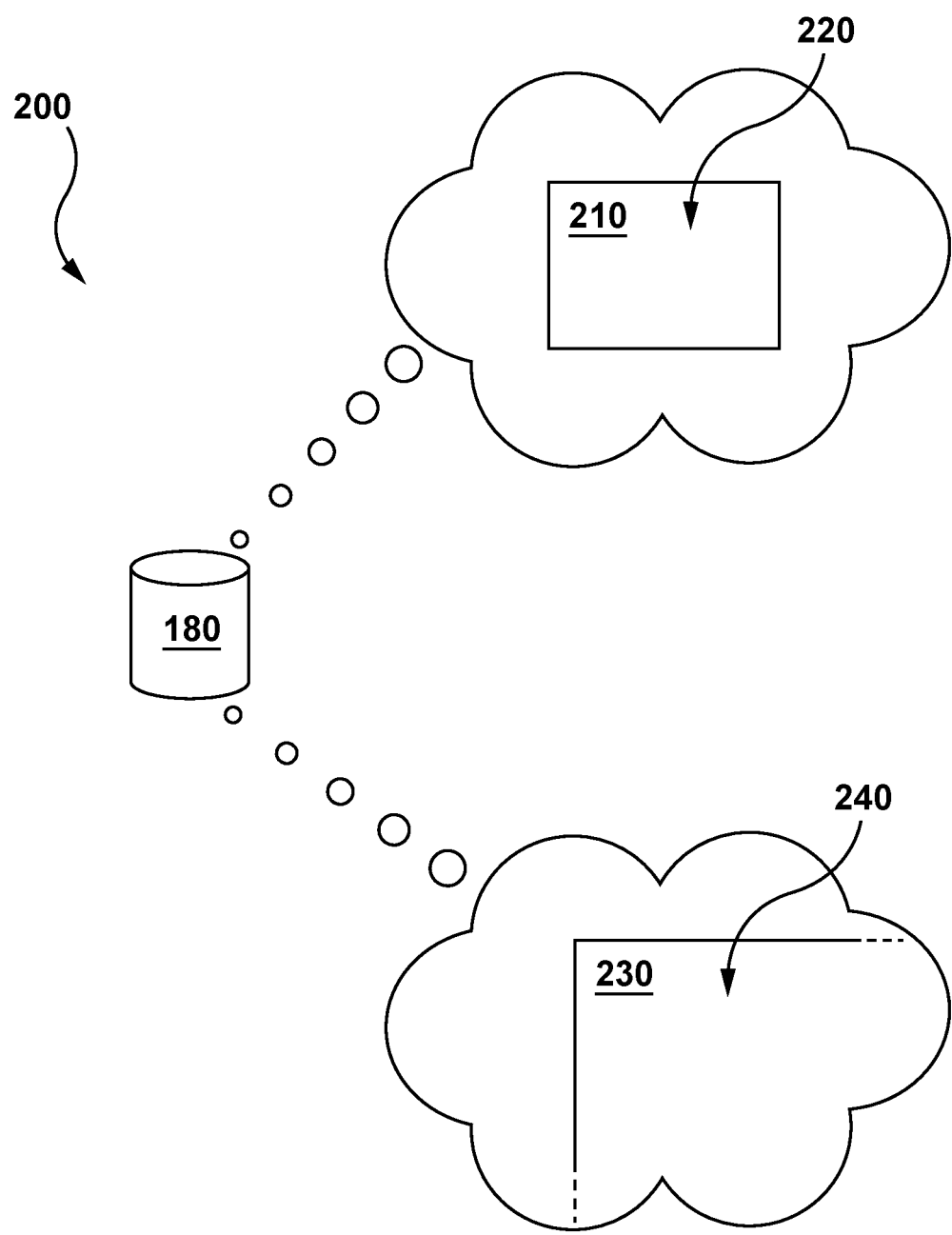
FIG. 2 depicts data storing in a storage of FIG. 1, in accordance with at least some non-limiting embodiments of the present technology.

With reference to both FIGS. 1 and 2, the system 100 also comprises a database 108 which is communicatively coupled to the server 106 and is configured to store information extracted or otherwise determined or generated by the server 106. Generally speaking, the database 108 may receive data from the server 106 which was extracted or otherwise determined or generated by the server 108 during processing for temporary and/or permanent storage thereof and may provide stored data to the server 106 for use thereof. It is contemplated that the database 108 may be split into several distributed databases without departing from the scope of the present technology. What data the database 108 may receive from and/or provide to the server 106 will become apparent from the description herein below.

With reference to FIG. 2, there is depicted a representation 200 of the database 180 storing data in accordance with at least some embodiments of the present technology. In at least some embodiments, it is contemplated that the database 180 may store token vocabulary data 210 and merge data 230.

The token vocabulary data 210, also referred to herein as "token vocabulary", may include a set of tokens 220. For example, a given token from the set of tokens 220 may be a single character such as, but not limited to: "a", "b", "c", and so forth. In another example, an other given token from the set of tokens may be a multi-character token such as, but not limited to: "ab", "abc", "re", "un", and so forth. It is contemplated that a given multi-character token may be composed of at least two single-character tokens. It can also be said that a given multi-character token may correspond to a merged token of at least two single-character tokens.

In some embodiments of the present technology, the token vocabulary data 210 may be acquired by the server 106 and stored in the database 108. In other embodiments, the token vocabulary data 210 may be generated by the server 106 and stored in the database 108. It is contemplated that, in at least one non-limiting embodiment, the vocabulary data 210 may be generated in accordance with a conventional BPE framework.

Irrespective of whether the token vocabulary data 210 is acquired or generated by the server 106, the token vocabulary data 210 is generated based on a pre-determined corpus of text. For example, the server 106 may parse the pre-predetermined corpus of text, determine a variety of single characters therein and a variety of multi-character sequences therein and identify them as respective tokens from the set of tokens 220. It can be said that in some embodiments the server 106 may be configured to perform an initialization routine for a character vocabulary based on words found in the pre-determined corpus of text for generating the token vocabulary 210. In some embodiments, this pre-determined corpus of text may be acquired by the server 106 from one or more of the plurality of network resources 112.

In addition to including the set of tokens 220, it is contemplated that in some embodiments of the present technology, the token vocabulary data 210 may further include additional data about the set of tokens 220 from the pre-determined corpus of text.

In yet a further embodiment, the set of tokens 220 in the token vocabulary 210 may include a given "UNK" token. As it will become apparent from the description herein further below, the server 106 may make use of the "UNK" token when one or more characters of a given word (from a text sequence) to be segmented are unknown or otherwise not identifiable by the server 106. In addition, the server 106 may be configured to replace the unknown or otherwise not identifiable token in a given final segmentation sequence by the "UNK" token from the token vocabulary 210—in some embodiments, this may be beneficial when processing the corresponding text sequence in order to use the corresponding text sequence as training data for training the MLA 124.

The merge data 230 may be stored in the database 108 in a form of a table, also referred to herein as a "merge table". The merge table 230 is indicative of a plurality of possible "merges" 240 between pairs of tokens from the set of tokens 220 of the token vocabulary 210. For example, the merge table 230 may be indicative of that a merge between the tokens "a" and "b" (amongst the set of tokens 220) is possible, while a merge between the tokens "x" and "z" (amongst the set of tokens 220) is not possible.

It is contemplated that in some embodiments, the merge table 230 may be acquired by the server 106, while in other embodiments, the server 106 may be configured to generate the merge table 230. It is contemplated that, in at least one non-limiting embodiment, the merge table 230 may be generated in accordance with a conventional BPE framework. In additional embodiments, the server 106 may be configured to generate the merge table 230 by performing an initialization routine on an empty table structure.

In addition to including the plurality of possible merges 240, it is contemplated that in some embodiments of the present technology, the merge table 230 may further include additional data about tokens associated with respective ones of the plurality of possible merges 240. For example, the merge table 230 may also include data indicative of a frequency of occurrence of the respective tokens associated with respective ones of the plurality of possible merges 240 as found in the pre-determined corpus of text.

How conventional BPE framework may be employed for performing subword segmentation and how, in contrast, the modified BPE framework proposed by the developers of the present technology may be employed for performing subword segmentation will now be described with reference to FIG. 3.

Figure 3:
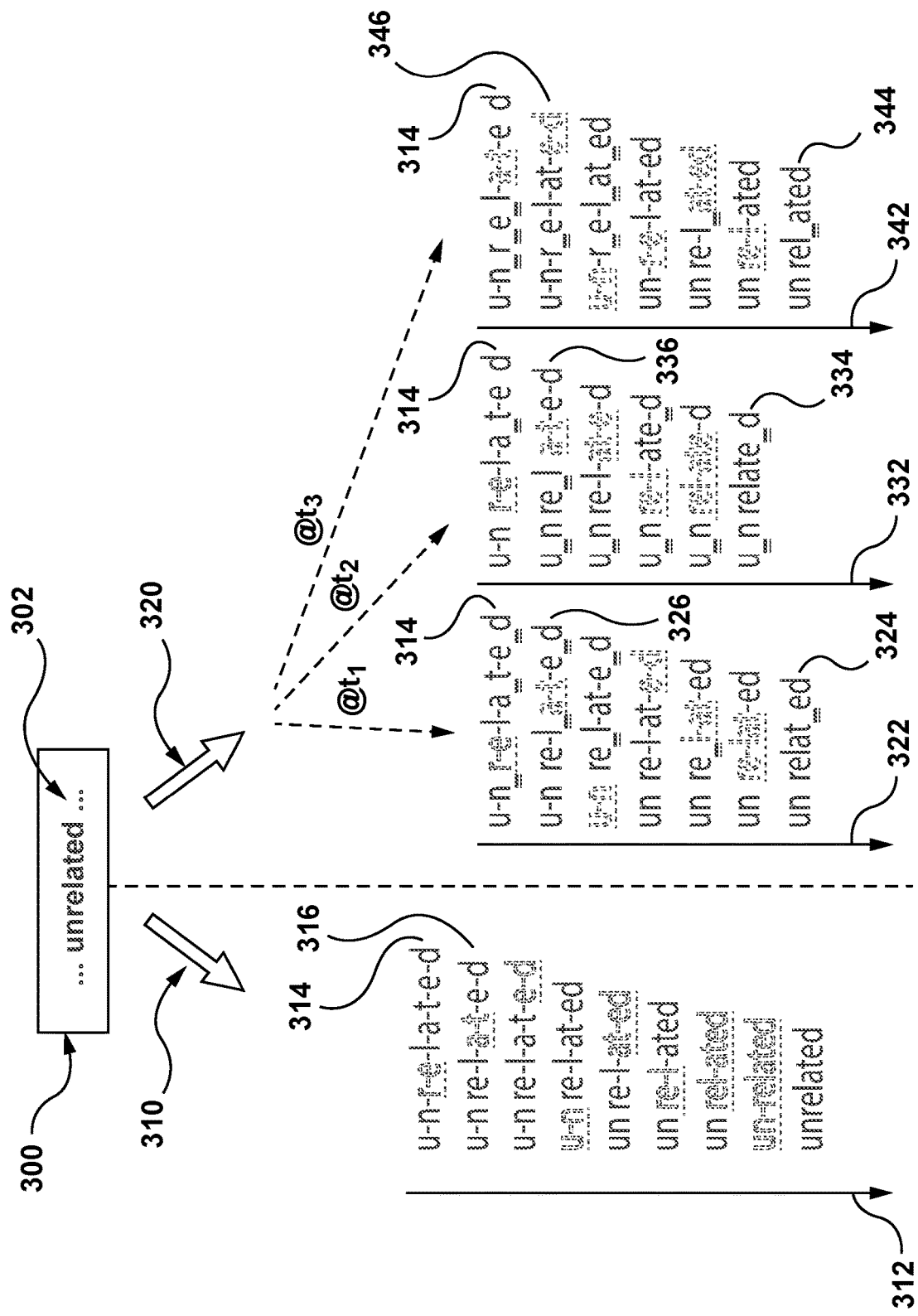
FIG. 3 depicts an example of a conventional subword segmentation process and examples of a modified subword segmentation process performed by the server of FIG. 1, in accordance with non-limiting embodiments of the present technology.

In FIG. 3, there is depicted a text sequence 300 containing inter alia a word 302 that is "unrelated". As previously alluded to, the server 106 may be configured to acquire the text sequence 300 for preparing it for a machine processing task performed by the MLA 124. It should be noted that in some embodiments of the present technology, the pre-determined corpus of text used to generate the token vocabulary 210 may not include the text sequence 300. For example, the server 106 may acquire the test sequence 300 for processing and/or preparing the text sequence 300 for being used as training data for training the MLA 124.
Conventional Subword Segmentation Process Also depicted in FIG. 3 is a conventional subword segmentation process 310 (in accordance with conventional BPE framework) of the word 302. As it can be seen, the conventional subword segmentation process 310 includes a plurality of iterations 312 during which various token sequences (based on the word 302) are generated. For example, the conventional subword segmentation process 310 may begin with splitting the word 302 into an initial token sequence 314 that represents individual characters of the work 302—that is, the word 302 is split into the initial token sequence 314 of ""u" "n" "r" "e" "l" "a" "t" "e" "d"".

It should be noted that the conventional subword segmentation process 310 may make use of the token vocabulary 210 and the merge table 230. For example, the token vocabulary 210 may be accessed for generating the initial token sequence 314. In a same example, during an initial iteration, the merge table 230 may be accessed and may be used to identify a set of possible merges between pairs of adjacent tokens in the initial token sequence 314. Let it be assumed that the set of possible merges amongst the plurality of possible merges 240 includes the possible merge of adjacent tokens "r" and "e" into a merged token "re", and other possible merges.

The merge table 230 may also be accessed to determine the frequency of occurrence of the respective merged tokens of the set of possible merges in the initial token sequence 314. Let it be assumed that the merged token "re" is associated with a highest frequency of occurrence in the merge table 230 if compared to any other merged token yieldable by the other possible merges from the set of possible merges. As such, during this initial iteration, the initial token sequence 314 may undergo merging, such that a potential merge amongst the set of possible merges yielding a merge token associated with a highest frequency of occurrence amongst all yieldable merge tokens of the set of possible merges is performed. Therefore, in this case, the initial token sequence is merged so as to generate a new token sequence 316 being ""u" "n" "re" "l" "a" "t" "e" "d"". This new token sequence 316 is then used as a current token sequence during a next iteration, and as such, a next iteration is performed on the new token sequence 316 mutatis mutandis.

As seen in FIG. 3, after a number of iterations having been performed similarly to the initial iteration, the conventional subword segmentation process 300 will yield a final token sequence "unrelated", which in this case is the word 302 itself. It is important to note that this result of the subword segmentation process 300 is deterministic in nature—that is, if a same token vocabulary and a same merge table are used by the subword segmentation process 300 during separate attempts at segmenting the word 302, the final token sequences yielded by the conventional subword segmentation process 300 during respective separate attempts would be identical to each other.

As previously alluded to, this conventional BPE framework is used to split words into unique subword sequences, which means that processing of a given each word will yield only one segmentation. This may be undesirable as such an approach may (i) prevent exploitation of word morphology, (ii) hinder learning based of word composition and (iii) increase segmentation errors.

Modified Subword Segmentation Process

Hence, in at least some embodiments of the present technology, there is provided a method and system capable of executing a modified BPE framework that is stochastic in nature—that is, when a modified subword segmentation process 320 is performed on a given word during separate attempts at segmenting the given word, the respective final token sequences yielded by respective separate attempts at segmenting the given word may be different from one another.

In FIG. 3, there is depicted three separate segmentation attempts of the word 302 "unrelated". For example, the server 106 may execute a first segmentation attempt at t1, a second segmentation attempt at t2, and a third segmentation attempt t3. As seen, the first segmentation attempt includes a plurality of iterations 322, the second segmentation attempt includes a plurality of iterations 332, and the third segmentation attempt includes a plurality of iterations 342. How the server 106 may be configured to execute the first segmentation attempt will now be described in greater details.

The first segmentation attempt may begin with the server 106 using the token vocabulary 210 for splitting the word 302 into the initial token sequence 314 being ""u" "n" "r" "e" "l" "a" "t" "e" "d"". It should be noted that this initial splitting, in some embodiments, may be performed similarly to how it is performed in the conventional subword segmentation process 310. Once the initial token sequence 314 is determined by the server 106, the server 106 may be configured to iteratively merge (via the plurality of iterations 322) tokens of the initial token sequence 314 to generate a final token sequence 324.

Initial Iteration of the First Segmentation Attempt

During the initial iteration of the plurality of iterations 322, the server 106 may be configured to use the merge table 230 for identifying a set of possible merges between pairs of adjacent tokens in a current token sequence of the initial iteration (i.e., during the initial iteration, the current token sequence is the initial token sequence 314).

Let it be assumed that the server 106 using the merge table 230 identifies the following set of possible merges:
"u"+"n" which would yield "un";
"n"+"r" which would yield "nr";
"r"+"e" which would yield "re";
"e"+"l" which would yield "el";
"l"+"a" which would yield "la";
"a"+"t" which would yield "at";
"t"+"e" which would yield "te"; and
"e"+"d" which would yield "ed".

However, unlike the conventional segmentation process 310, where a given merge is selected solely on which yieldable token has a highest frequency of occurrence in the merge table 230, during the subword segmentation process 320 the server 106 may be configured to exclude at least one possible merge from the set of possible merges. To achieve this, the server 106 may be configured to employ a "dropout" probability.

In some non-limiting embodiments of the present technology, the dropout probability may be pre-determined (by the operator, for example). Let it be assumed that the pre-determined dropout probability is 0.1. This means that the server 106 may be configured to execute a dropout algorithm that may "drop" a given possible merge from the set of possible merges with a probability of 10%. This can be repeated by the server 106 for each one of the set of possible merges. It can be said that the server 106 may be configured to execute the dropout algorithm configured to perform a stochastically-driven exclusion of at least some possible merges in the set of possible merges.

In an other non-limiting embodiment, the server 106 is configured to execute the dropout algorithm configured to assign a random value to respective ones of the set of possible merges ranging from 0 to 1. In some cases, the algorithm may be configured to randomly assign the random values to respective ones of the set of possible merges. Once the random values are assigned to respective ones of the set of possible merges, the server 106 may be configured to compare these random values against a pre-determined threshold value. If a given random value is above the pre-determined threshold value, the respective possible merge from the set of possible merges is included into a reduced set of possible merges. However, if a given random value is below the pre-determined threshold value, the respective possible merge from the set of possible merges is excluded from a reduced set of possible merges.

In other words, the server 106 may be configured to determine a reduced set of possible merges from the set of possible merges by assigning respective ones of the set of possible merges with random values (for example, random values between 0 and 1) and verifying whether they are above or below the pre-determined threshold. This verification may be used by the server 106 as an inclusion and/or exclusion criterion determining whether a given possible merge from the set of possible merges is to be present in a reduced set of possible merges. In this non-limiting embodiment, it can also be said that the server 106 may execute an algorithm configured to perform a stochastically-driven exclusion of at least some possible merges in the set of possible merges.

In yet a further non-limiting embodiment of the present technology, the server 106 may be configured to exclude at least one of the set of possible merges by using an algorithm configured to yield a random value ranging from 0 to 1 and which is indicative of whether or not at least one of the set of possible merges is to be excluded. This random value may also be compared to a given pre-determined threshold value. For example, if this random value is below the given pre-determined threshold value, the server 106 may determine not to exclude at least one of the set of possible merges. If this random value is above the given pre-determined threshold value, the server 106 may determine to exclude at least one of the set of possible merges (randomly, for example). In this non-limiting embodiment, it can also be said that the server 106 may execute an algorithm configured to perform a stochastically-driven exclusion of at least some possible merges in the set of possible merges.

All in all, it is contemplated that in the context of the present technology, the server 106 may be configured to use one or more stochastic process for excluding one or more of the set of possible merges. To that end, it is contemplated that the server 106 may make use of a given pre-determined dropout probability for ensuring a stochastically-driven exclusion of at least one of the set of possible merges.

Returning to the description of FIG. 3, let it be assumed that during this initial iteration, the server 106 makes use of the dropout probability for excluding from the set of possible merges:
 "u"+"n" which would yield "un";
 "n"+"r" which would yield "nr";
 "r"+"e" which would yield "re";
 "e"+"l" which would yield "el";
 "l"+"a" which would yield "la";
 "a"+"t" which would yield "at";
 "t"+"e" which would yield "te"; and
 "e"+"d" which would yield "ed",
the following possible merges:
 "n"+"r" which would yield "nr";
 "a"+"t" which would yield "at"; and
 "e"+"d" which would yield "ed".
Therefore, the server 106 may be configured to generate a reduced set of possible merges for this initial iteration including:
 "u"+"n" which would yield "un";
 "r"+"e" which would yield "re"
 "e"+"l" which would yield "el";
 "l"+"a" which would yield "la"; and
 "t"+"e" which would yield "te".

The server 106 may then be configured to access the token vocabulary 210 for selecting which one of the reduced set of possible merges of the initial iteration is to be performed. For example, the server 106 may determine from the merge table 230 that the merged token "re" has a higher frequency of occurrence than any other yieldable merged token by the reduced set of possible merges—that is, the server 106 may determine that the frequency of occurrence of the merged token "re" is higher than any one of "un", "el", "la", and "te".

As a result, the server 106 may be configured to perform the possible merge "r"+"e" and from the reduced set of possible merges, and thereby yielding "re". The server 106 is thereby configured to generate a new token sequence 326 ""u" "n" "re" "l" "a" "t" "e" "d"". The server 106 may then use the new token sequence 326 as the current token sequence of the next iteration from the plurality of iterations 322.

It should be noted that, in this specific example of the initial iteration of the subword segmentation process 320, the server 106 may yield the new token sequence 326 that is identical to the new token sequence 316 yielded by the conventional subword segmentation process 310. However, it should be noted that this is the case because, in this specific example, in has been assumed that the server 106 performed a stochastically-driven exclusion of possible merges that does not include the possible merge "r"+"e" associated with the highest frequency of occurrence.

However, as it will be shown with reference to the initial iteration of the third segmentation attempt, the specific example described above yielding the new token sequence 326 that is identical to the new token sequence 316 yielded by the conventional subword segmentation process 310 is only coincidental.

Initial Iteration of the Third Segmentation Attempt

Let it be assumed that, as it was the case in the previous example, the current token sequence during this initial iteration is also the initial token sequence 314, and that the server 106 identifies the same set of possible merges for this initial iteration:
 "u"+"n" which would yield "un";
 "n"+"r" which would yield "nr";
 "r"+"e" which would yield "re";
 "e"+"l" which would yield "el";
 "l"+"a" which would yield "la";
 "a"+"t" which would yield "at";
 "t"+"e" which would yield "te"; and
 "e"+"d" which would yield "ed".

However, unlike in the previous example, let it be assumed that during this initial iteration, the server 106 makes use of the pre-determined dropout probability for excluding from the set of possible merges:
 "u"+"n" which would yield "un";
 "n"+"r" which would yield "nr";
 "r"+"e" which would yield "re";
 "e"+"l" which would yield "el";
 "l"+"a" which would yield "la";
 "a"+"t" which would yield "at";
 "t"+"e" which would yield "te"; and
 "e"+"d" which would yield "ed", the following possible merges:
 "n"+"r" which would yield "nr";
 "r"+"e" which would yield "re"; and
 "e"+"l" which would yield "el".

Therefore, the server 106 may be configured to generate a reduced set of possible merges for this initial iteration including:
 "u"+"n" which would yield "un";
 "l"+"a" which would yield "la";
 "a"+"t" which would yield "at";
 "t"+"e" which would yield "te"; and
 "e"+"d" which would yield "ed".

The server 106 may then be configured to access the token vocabulary 210 for selecting which one of the reduced set of possible merges of this initial iteration is to be performed. For example, the server 106 may determine from the merge table 230 that the merged token "at" has a higher frequency of occurrence than any other yieldable merged token by the reduced set of possible merges—that is, the server 106 may determine that the frequency of occurrence of the merged token "at" is higher than any one of "un", "la", "te", and "ed".

As a result, the server 106 may be configured to perform the possible merge "a"+"t" and from the reduced set of possible merges, and thereby yielding "at". The server 106 is thereby configured to generate a new token sequence 346 ""u" "n" "r" "e" "l" "at" "e" "d"". The server 106 may then use the new token sequence 346 as the current token sequence of the next iteration from the plurality of iterations 342.

As it can be seen, in this specific example, the server 106 performing a stochastically-driven exclusion of at least some of the set of possible merges may allow yielding the new token sequence 346 that is different from the new token sequence 316 yielded during the conventional subword segmentation process 310. However, it should also be noted that the server 106 performing the same process, during the initial iteration of the first segmentation attempt and during the initial iteration of the third segmentation attempt, yielded two different token sequences—that is, during the initial iteration of the first segmentation attempt the server 106 yielded the new token sequence 326, and during the initial iteration of the third segmentation attempt the server 106 yielded the new token sequence 346. Again, this difference between new token sequences generated based on a same current token sequence is due to the stochastically-driven exclusion of some possible merge(s) from the set of possible merges.

Therefore, as seen in FIG. 3, although the first segmentation attempt, the second segmentation attempt, and the third segmentation attempt begin with the same initial token sequence (i.e., the initial token sequence 314), each of the first segmentation attempt, the second segmentation attempt, and the third segmentation attempt end with different final token sequences—that is, (i) the server 106 performing the plurality of iteration 322 based of the initial token sequence 314 generates the final token sequence 324 (as a result of the first segmentation attempt), (ii) the server 106 performing the plurality of iteration 332 based of the initial token sequence 314 generates the final token sequence 334 (as a result of the second segmentation attempt), and (iii) the server 106 performing the plurality of iteration 342 based of the initial token sequence 314 generates the final token sequence 344 (as a result of the third segmentation attempt), and where the final token sequences 324, 334, and 344 are different form one another.

It should be noted that the server 106 being able to generate different final token sequences while employing the subword segmentation process 320 may be attributable to different respective ones of the reduced set of possible merges used and where having the different respective ones of the reduced set of possible merges used is due to the stochastic nature of the subword segmentation process 320. In some embodiments, this difference may further be attributable to the server 106 using different dropout probabilities during respective segmentation attempts.

In summary, it can be said that during use of the subword segmentation process 320, the server 106 is configured to, at a given merging iteration (e.g., including the initial merging iteration), use the merge table 230 for identifying a set of possible merges between pairs of adjacent tokens in a current token sequence of the given merging iteration (if the given merging iteration is the given initial merging iteration, then the current token sequence is the given initial token sequence). Also, during use of the subword segmentation process 320, the server 106 is configured to, at the given merging iteration, exclude at least one of the set of possible merges based on a dropout probability, thereby generating a reduced set of possible merges for the given merging iteration. The implementation of the pre-determined dropout probability may vary, as explained above, and may depend on a particular implementation of the present technology. Nevertheless, the use of the dropout probability by the server 106 allows the server 106 to perform a stochastically-driven exclusion of at least one of the set of possible merges for generating the respective reduced set of possible merges for the given merging iteration. Then, during use of the subword segmentation process 320, the server 106 is configured to, at the given merging iteration, use the reduced set of possible merges for generating a given new token sequence by performing at least one of the reduced set of possible merges in the given current token sequence (for example, the selection of which of the reduced set of possible merges is to be performed may be based on the frequency of occurrence of respective ones of the reduced set of possible merges). Then, during use of the subword segmentation process 320, the server 106 is configured to use the given new token sequence as a given current token sequence of a next merging iteration.

It should be noted that, during an other given merging iteration after the given merging iteration, in response to no more merges being available for a given current token sequence of the other given merging iteration, the server 106 may be configured to identifying the given current token sequence of the other given merging iteration as a given final token sequence to be used for the machine processing task (such as the final token sequences 324, 334, and 344, for example).

It should be noted that the manner in which the server 106 may be configured to execute the subword segmentation process 320, in at least some embodiments of the present technology, is described in greater detail in an article entitled "BPE-dropout: Simple and Effective Subword regularization", which is appended herewith and the content thereof is thereby incorporated herein in its entirety.

Figure 4:
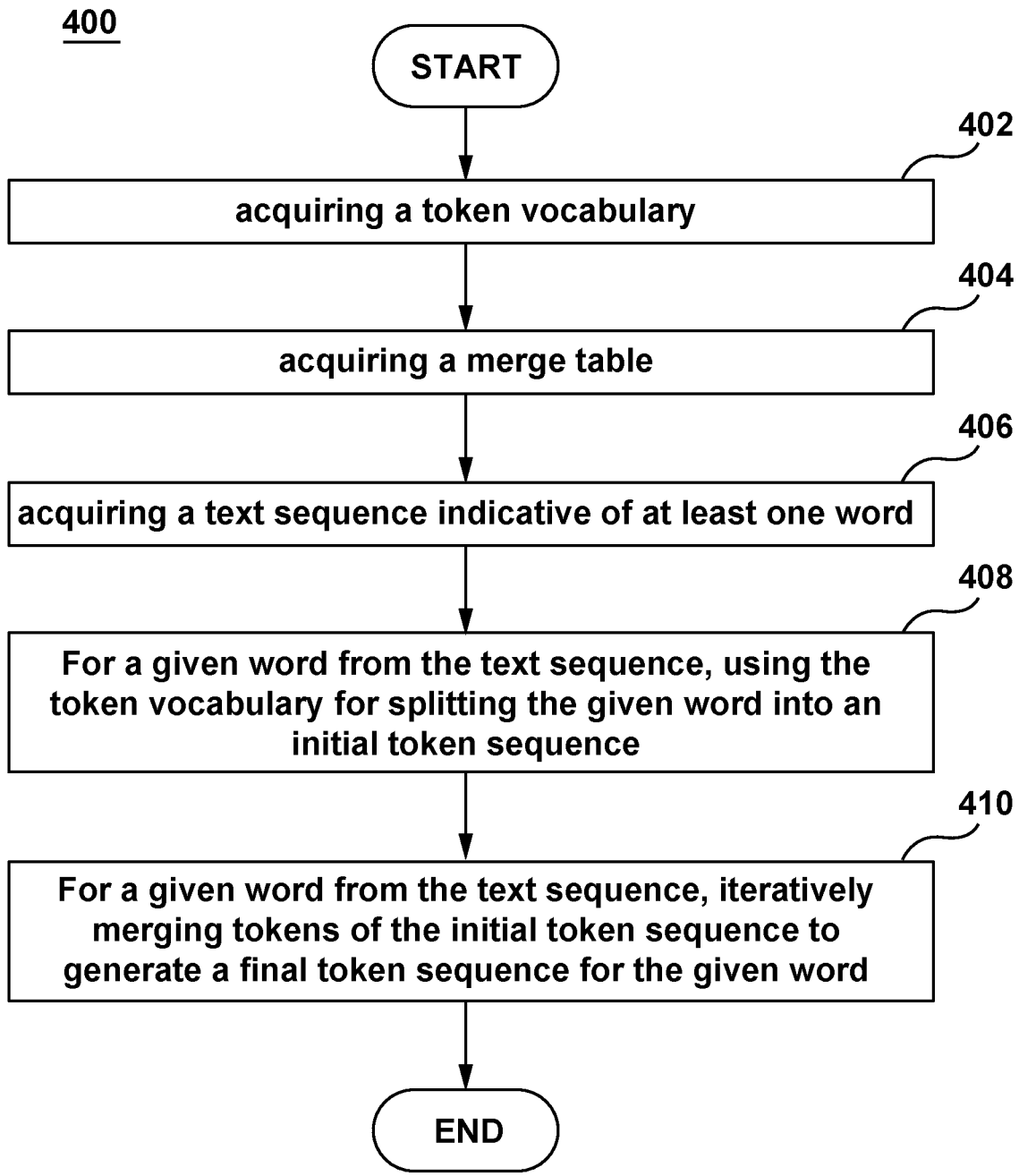
FIG. 4 is a schematic block diagram of a flow chart of a method of processing a text sequence for a machine processing task in accordance with non-limiting embodiments of the present technology.

In some embodiments of the present technology, the server 106 may be configured to execute a method 400, depicted in FIG. 4, of preparing a text sequence for a machine processing task to be performed by the MLA 124. Various steps of the method 400 will now be described in greater details herein further below.

STEP 402: Acquiring a Token Vocabulary

The method 400 begins at step 402 with the server 106 acquiring the token vocabulary 210. The token vocabulary 210 includes the set of tokens 220, as explained above. For example, a given token from the set of tokens 220 may be a single character such as, but not limited to: "a", "b", "c", and so forth. In another example, an other given token from the set of tokens may be a multi-character token such as, but not limited to: "ab", "abc", "re", "un", and so forth. It is contemplated that a given multi-character token may be composed of at least two single-character tokens. It can also be said that a given multi-character token may correspond to a merged token of at least two single-character tokens.

It should be noted that in some embodiments of the present technology, the server 106 may be configured to generate the token vocabulary 210. For example, the server 106 may execute an initialization routine onto a character vocabulary from the pre-determined corpus of text. In some embodiments, the token vocabulary 210 may be built by the server 106 employing a conventional BPE framework.

In some embodiments, the set of tokens 220 in the token vocabulary 210 may include a given "UNK" token. As mentioned above, the server 106 may make use of the "UNK" token when one or more characters of a given word (from a text sequence) to be segmented are unknown or otherwise not identifiable by the server 106. In addition, the server 106 may be configured to replace the unknown or otherwise not identifiable token in a given final segmentation sequence by the "UNK" token from the token vocabulary 210.

STEP 404: Acquiring a Merge Table

The method 400 continues to step 404 with the server 106 acquiring the merge table 230 that indicates possible mergers between pairs of tokens from the set of tokens 220, or in other words, is indicative of the plurality of possible merges 240 between pairs of tokens from the set of tokens 220 of the token vocabulary 210.

For example, the merge table 230 may be indicative of that a merge between the tokens "a" and "b" (amongst the set of tokens 220) is possible, while a merge between the tokens "x" and "z" (amongst the set of tokens 220) is not possible. It is contemplated that in some embodiments, the merge table 230 may be acquired by the server 106, while in other embodiments, the server 106 may be configured to generate the merge table 230. As mentioned above, the merge table 230 may be generated in accordance with a conventional BPE framework. In additional embodiments, the server 106 may be configured to generate the merge table 230 by performing an initialization routine on an empty table structure.

It should be noted that the merge table 230 may further include data indicative of the frequency of occurrence of respective tokens from the respective ones of the plurality of possible merges 240. For example, a frequency of occurrence of a given token in a given one of the plurality of possible merges 240 may correspond to its frequency of occurrence in the pre-determined corpus of text.

STEP 406: Acquiring a Text Sequence Indicative of at Least One Word

The method 400 continues to step 406 with the server 106 acquiring the text sequence 300 including the word 302. It should be noted that this text sequence 300 may be used for training the MLA 124. However, the server 106 executing the method 400 may process the text sequence 300 in a way that it can be used as training data for the MLA 124.

It should be noted that in at least some embodiments, the pre-determined corpus of text may or may not include the text sequence 300, without departing from the scope of the present technology.

STEP 408: For a Given Word from the Text Sequence, Using the Token Vocabulary for Splitting the Given Word into an Initial Token Sequence The method 400 continues to step 408 with the server 106 configured to use the token vocabulary 210 for splitting the word 302 (or any other given word of the text sequence 300) into the initial token sequence 314. The initial token sequence 314 represents individual characters of the word 302. For example, the server 106 may be configured to access to token vocabulary for retrieving a token for each corresponding character from the word 302.

STEP 410: For a Given Word from the Text Sequence, Iteratively Merging Tokens of the Initial Token Sequence to Generate a Final Token Sequence for the Given Word The method 400 continues to step 410 with the server 106 iteratively merging tokens of the initial token sequence 314 to generate a given final token sequence for the word 302. For example, this iterative merging performed by the server 106 may correspond to the server 106 performing the plurality of iterations 322 for generating the final token sequence 324. In another example, this iterative merging performed by the server 106 may correspond to the server 106 performing the plurality of iterations 332 for generating the final token sequence 334. In a further example, this iterative merging performed by the server 106 may correspond to the server 106 performing the plurality of iterations 342 for generating the final token sequence 344.

It should be noted that the word 302 may be part of the text sequence 300 and part of an other text sequence that is to be processed by the server 106 using the subword segmentation process 320. For example, the server 106 may be configured to perform the first segmentation attempt of the word 302 when processing the text sequence 300 while performing the second segmentation attempt of the word 302 when processing the other text sequence. As a result, it is contemplated that the server 106 may be configured to generate the final token sequence 324 for the word 302 in the text sequence 300, while generating the final token sequence 334 for the word 304 in the other text sequence. In some embodiments, a difference between the final token sequence 334 and the final token sequence 334 may be attributable to different reduced set of possible merges used by the server 106 during respective segmentation attempts of the word 302 and which are caused by the stochastic nature of the subword segmentation process 320. It is also contemplated that this difference may be further attributable to different dropout probabilities being used by the server 106 during the first segmentation attempt and during the second segmentation attempt.

In some embodiments of the present technology, the server 106 may be configured, during a given merging iteration use a pre-determined probability and/or a given stochastically-driven algorithm for selectively including possible merges from the set of possible merges into an augmented set of possible merges for the given merging iteration. In some cases, the augmented set of possible merges may be the same as the set of possible merges, if the server 106 using the pre-determined probability and/or a given stochastically-driven algorithm did not selectively exclude any given possible merge from the set of possible merges. In other cases, the augmented set of possible merges may be smaller than the set of possible merges, if the server 106 using the pre-determined probability and/or a given stochastically-driven algorithm did selectively exclude at least one possible merge from the set of possible merges. In these embodiments, the server 106 may use the augmented set of possible merges for generating a new token sequence for the given merging iteration by performing at least one of the augmented set of possible merges in the current token sequence, similarly what has been described above.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for processing a text sequence for a machine processing task to be performed by a Machine Learning Algorithm (MLA) comprising a neural network, the method executable by a server, the method comprising:
   acquiring, by the server, a token vocabulary, the token vocabulary storing a set of tokens from a pre-determined corpus of text, a given token from the set of tokens being one of a single character and a merged set of tokens;
   acquiring, by the server, a merge table, the merge table indicating possible mergers between pairs of tokens from the set of tokens, a given token from a given possible merge being associated with a respective frequency of occurrence of the given token in the pre-determined corpus of text;
   acquiring, by the server, the text sequence indicative of at least one word;
   for a given word from the text sequence:
   using, by the server, the token vocabulary for splitting the given word into an initial token sequence, the initial token sequence representing individual characters of the given word;
   iteratively merging, by the server, tokens of the initial token sequence to generate a final token sequence for the given word, the iteratively merging including:
   at a given merging iteration:
   using, by the server, the merge table for identifying a set of possible merges between pairs of adjacent tokens in a current token sequence of the given merging iteration;
   excluding, by the server, at least one of the set of possible merges based on a dropout probability, thereby generating a reduced set of possible merges for the given merging iteration, the reduced set of possible merges being smaller than the set of possible merges;

using, by the server, the reduced set of possible merges for generating a new token sequence by performing at least one of the reduced set of possible merges in the current token sequence, the new token sequence to be used by the server as a current token sequence during a next merging iteration, at an other given merging iteration after the given merging iteration:

in response to no more merges being available for a current token sequence of the other given merging iteration, identifying, by the server, the current token sequence of the other given merging iteration as the final token sequence to be used for the machine processing task, and inputting the final token sequence to the neural network.

2. The method of claim 1, wherein the using the reduced set of possible merges comprises selecting, by the server, the at least one of the reduced set of possible merges to be performed based on the respective frequency of occurrence of the reduced set of possible merges.

3. The method of claim 1, wherein the method further comprises acquiring an indication of the pre-determined dropout probability.

4. The method of claim 1, wherein the MLA is a Neural Machine translation type MLA.

5. The method of claim 1, wherein the method further comprises prior to, the acquiring the token vocabulary and the acquiring of the merge table, generating the token vocabulary and the merge table based on the pre-determined corpus of text.

6. The method of claim 5, wherein the corpus of text does not contain the text sequence.

7. The method of claim 5, wherein the generating the token vocabulary comprises an initialization routine based on a character vocabulary.

8. The method of claim 5, wherein the generating the merge table comprises an initialization routine with an empty table.

9. The method of claim 1, wherein the text sequence is a first text sequence including a given word and wherein the method further comprises processing a second text sequence having the given word, and wherein a first final token sequence of the given word associated with the first text sequence is different from a second final token sequence of the given word associated with the second text sequence.

10. The method of claim 9, wherein a difference between the first final token sequence and the second final token sequence are attributable to different respective ones of the reduced set of possible merges used.

11. The method of claim 10, wherein the difference is further attributable to a different respective ones of the dropout probability used.

12. A computer-implemented method for preparing a text sequence for a machine processing task to be performed by a Machine Learning Algorithm (MLA) comprising a neural network, the method executable by a server, the method comprising:

acquiring, by the server, a token vocabulary, the token vocabulary storing a set of tokens from a pre-determined corpus of text, a given token from the set of tokens being one of a single character and a merged set of tokens;

acquiring, by the server, a merge table, the merge table indicating possible mergers between pairs of tokens from the set of tokens, a given token from a given possible merge being associated with a respective frequency of occurrence of the given token in the pre-determined corpus of text;

acquiring, by the server, the text sequence indicative of at least one word;

for a given word from the text sequence:

using, by the server, the token vocabulary for splitting the given word into an initial token sequence, the initial token sequence representing individual characters of the given word;

iteratively merging, by the server, tokens of the initial token sequence to generate a final token sequence for the given word, the iteratively merging including:

at a given merging iteration:

using, by the server, the merge table for identifying a set of possible merges between pairs of adjacent tokens in a current token sequence of the given merging iteration;

using, by the server, a pre-determined probability for selectively including possible merges from the set of possible merges into an augmented set of possible merges for the given merging iteration;

using, by the server, the augmented set of possible merges for generating a new token sequence by performing at least one of the augmented set of possible merges in the current token sequence, the new token sequence to be used by the server as a current token sequence during a next merging iteration, at an other given merging iteration after the given merging iteration:

in response to no more merges being available for a current token sequence of the other given merging iteration, identifying, by the server, the current token sequence of the other given merging iteration as the final token sequence to be used for the machine processing task, and inputting the final token sequence to the neural network.

13. The method of claim 12, wherein the augmented set of possible merges is smaller than the set of possible merges.

14. The method of claim 12, wherein the augmented set of possible merges is the same as the set of possible merges.

15. A server for processing a text sequence for a machine processing task to be performed by a Machine Learning Algorithm (MLA) comprising a neural network, the server having access to the MLA, the server being configured to:

acquire a token vocabulary, the token vocabulary storing a set of tokens from a pre-determined corpus of text, a given token from the set of tokens being one of a single character and a merged set of tokens;

acquire a merge table, the merge table indicating possible mergers between pairs of tokens from the set of tokens, a given token from a given possible merge being associated with a respective frequency of occurrence of the given token in the pre-determined corpus of text;

acquire the text sequence indicative of at least one word;

for a given word from the text sequence:

use the token vocabulary for splitting the given word into an initial token sequence, the initial token sequence representing individual characters of the given word;

iteratively merge tokens of the initial token sequence to generate a final token sequence for the given word, the iteratively merging including:

at a given merging iteration:

use the merge table for identifying a set of possible merges between pairs of adjacent tokens in a current token sequence of the given merging iteration;

exclude at least one of the set of possible merges based on a pre-determined dropout probability, thereby generating a reduced set of possible merges for the given merging iteration, the reduced set of possible merges being smaller than the set of possible merges;

use the reduced set of possible merges for generating a new token sequence by performing at least one of the reduced set of possible merges in the current token sequence, the new token sequence to be used by the server as a current token sequence during a next merging iteration, at an other given merging iteration after the given merging iteration:

in response to no more merges being available for a current token sequence of the other given merging iteration, identify the current token sequence of the other given merging iteration as the final token sequence to be used for the machine processing task, and input the final token sequence to the neural network.

16. The server of claim 15, wherein to use the reduced set of possible merges comprises the server configured to select the at least one of the reduced set of possible merges to be performed based on the respective frequency of occurrence of the reduced set of possible merges.

17. The server of claim 15, wherein the server is further configured to acquire an indication of the pre-determined dropout probability.

18. A computer-implemented method for processing a text sequence for a machine processing task to be performed by a Machine Learning Algorithm (MLA) comprising a neural network, the method executable by a server, the method comprising:

acquiring, by the server, a token vocabulary, the token vocabulary storing a set of tokens from a pre-determined corpus of text, a given token from the set of tokens being one of a single character and a merged set of tokens;

acquiring, by the server, a merge table, the merge table indicating possible mergers between pairs of tokens from the set of tokens, a given token from a given possible merge being associated with a respective frequency of occurrence of the given token in the pre-determined corpus of text;

acquiring, by the server, the text sequence indicative of at least one word;

for a given word from the text sequence:

using, by the server, the token vocabulary for splitting the given word into an initial token sequence, the initial token sequence representing individual characters of the given word;

iteratively merging, by the server, tokens of the initial token sequence to generate a final token sequence for the given word, the iteratively merging including:

at a given merging iteration:

using, by the server, the merge table for identifying a set of possible merges between pairs of adjacent tokens in a current token sequence of the given merging iteration;

using, by the server, a stochastically-driven algorithm for excluding at least one of the set of possible merges, thereby generating a reduced set of possible merges for the given merging iteration, the reduced set of possible merges being smaller than the set of possible merges;

using, by the server, the reduced set of possible merges for generating a new token sequence by performing at least one of the reduced set of possible merges in the current token sequence, the new token sequence to be used by the server as a current token sequence during a next merging iteration, at an other given merging iteration after the given merging iteration:

in response to no more merges being available for a current token sequence of the other given merging iteration, identifying, by the server, the current token sequence of the other given merging iteration as the final token sequence to be used for the machine processing task, and inputting the final token sequence to the neural network.

* * * * *